US011874058B2

(12) United States Patent
Scholey

(10) Patent No.: US 11,874,058 B2
(45) Date of Patent: Jan. 16, 2024

(54) INFRARED CAN CURING OVEN

(71) Applicant: Stolle Machinery Company, LLC, Centennial, CO (US)

(72) Inventor: Ian Kenneth Scholey, Barnsley (GB)

(73) Assignee: Stolle Machinery Company, LLC, Centennial, CO (US)

( * ) Notice: Subject to any disclaimer, the term of this patent is extended or adjusted under 35 U.S.C. 154(b) by 169 days.

(21) Appl. No.: 16/952,659

(22) Filed: Nov. 19, 2020

(65) Prior Publication Data

US 2021/0071949 A1 Mar. 11, 2021

Related U.S. Application Data

(63) Continuation of application No. 16/123,005, filed on Sep. 6, 2018, now Pat. No. 10,871,326.

(51) Int. Cl.

| | |
|---|---|
| ***F26B 3/30*** | (2006.01) |
| ***F26B 15/12*** | (2006.01) |
| ***B41M 7/00*** | (2006.01) |
| ***F26B 15/08*** | (2006.01) |

(52) U.S. Cl.

CPC ......... *F26B 15/128* (2013.01); *B41M 7/0054* (2013.01); *F26B 3/305* (2013.01); *F26B 15/085* (2013.01)

(58) Field of Classification Search

CPC ...... F26B 15/128; F26B 15/085; F26B 15/18; F26B 3/305; F26B 3/0263; F26B 3/30; F26B 25/003; B41M 7/0054; B05D 2258/02

USPC ............................................ 34/105; 118/642

See application file for complete search history.

(56) References Cited

U.S. PATENT DOCUMENTS

| | | | | |
|---|---|---|---|---|
| 1,511,835 A * | 10/1924 | Mueller | F26B 15/18 34/105 |
| 3,894,237 A | 7/1975 | Choate et al. | |
| 4,008,401 A | 2/1977 | Holoubek et al. | |
| 4,050,888 A | 9/1977 | Pfister et al. | |
| 4,297,583 A | 10/1981 | Nerod | |

(Continued)

FOREIGN PATENT DOCUMENTS

| | | |
|---|---|---|
| EP | 2466237 A2 | 6/2012 |
| JP | 5674584 A | 6/1981 |

(Continued)

OTHER PUBLICATIONS

European Patent Office, EP Patent Application No. 19858585.3 Supplementary European Search Report, dated Oct. 28, 2021, 8 pages.

(Continued)

*Primary Examiner* — John P McCormack

(74) *Attorney, Agent, or Firm* — Eckert Seamans Cherin & Mellott, LLC

(57) ABSTRACT

A can curing oven including a housing assembly, a transfer assembly, and a number of heating units. The housing assembly defines a generally enclosed space. The transfer assembly is structured to support and move a number of can bodies. The transfer assembly includes an elongated transfer belt. The transfer belt is movably coupled to the housing assembly and is structured to move through the housing assembly enclosed space. The number of heating units are structured to generate an effective amount of received heat.

20 Claims, 5 Drawing Sheets

(56) References Cited

U.S. PATENT DOCUMENTS

| | | | | | |
|---|---|---|---|---|---|
| 4,327,665 | A | | 5/1982 | Arrasmith | |
| 4,535,549 | A | * | 8/1985 | Lala | B41F 23/005<br>34/275 |
| 4,820,365 | A | | 4/1989 | Brumm et al. | |
| 5,271,164 | A | * | 12/1993 | Yoshimura | F26B 5/12<br>34/106 |
| 5,755,884 | A | * | 5/1998 | Buckler | B05B 12/006<br>118/712 |
| 6,767,406 | B2 | * | 7/2004 | Vitale | B05C 9/10<br>118/421 |
| 7,412,979 | B2 | * | 8/2008 | Green | B08B 9/30<br>134/40 |
| 9,451,658 | B2 | * | 9/2016 | Baxter | B05D 3/207 |
| 2006/0127616 | A1 | | 6/2006 | Beck | |
| 2007/0022624 | A1 | | 2/2007 | Chu Yuk Man | |
| 2015/0175289 | A1 | | 6/2015 | Zumbach | |
| 2018/0153668 | A1 | * | 6/2018 | Senn | A61C 19/004 |
| 2020/0017305 | A1 | | 1/2020 | De Carvalho Costa | |

FOREIGN PATENT DOCUMENTS

| | | | |
|---|---|---|---|
| JP | 59219685 | A | 12/1984 |
| JP | 2002039675 | A | 2/2002 |
| JP | 2014-501896 | A | 1/2014 |
| WO | 2006010141 | | 1/2006 |
| WO | 2013047917 | A1 | 4/2013 |

OTHER PUBLICATIONS

Japan Patent Office, JP Patent Application No. 2021-512680, Office Action, dated May 16, 2023, 5 pages and English translation.

* cited by examiner

INFRARED CAN CURING OVEN

CROSS REFERENCE TO RELATED APPLICATION

This application is a continuation application of and claims priority to U.S. patent application Ser. No. 16/123,005, filed Sep. 6, 2018 entitled, INFRARED CAN CURING OVEN.

BACKGROUND OF THE INVENTION

Field of the Invention

The disclosed and claimed concept relates to an oven for drying a coating on the exterior of a can and, more particularly, to an oven that utilizes infrared beating units.

Background Information

Pin ovens are well known in the art and are widely used in the industry for drying the coating on the exterior of partially completed, open-ended beverage cans. A can decorator applies the coating to the exterior of the cans. The coating includes, but is not limited to, ink, enamel used to apply the label, an overcoat of lacquer or varnish, or both a printed label and overcoat. The oven includes a number of heaters, typically natural gas heaters, that generate a heated fluid (air). That is, natural gas is burned thereby heating the air. The heated air is generally maintained in a heated, enclosed space through which a conveyor chain follows a generally vertical serpentine path. As such, pin ovens occupy a large volume and have a complex motion assembly. That is, in order for the conveyor chain to have a path of sufficient length to allow the cans to cure, the enclosed space typically has a volume of about 75 $m.^3$ This is a problem as the ovens occupy a large space within a processing facility. Further, a conveyor that extends over a serpentine path requires complex mechanical assemblies to accommodate the change in direction of the conveyor. This is a problem as the complex mechanical assemblies are expensive and prone to wear.

The conveyor chain supports the cans on a number of pins. That is, elongated carrier pins are attached to the conveyor chain in spaced relation along its entire length. The open-ended cans are placed onto the extended pins and are carried over a serpentine chain path through the oven. Nozzles aligned with the chain path direct heated air against the outsides of the cans as they travel through the oven enclosed space. The heated air both maintains the cans on the pins and cures the coating. As the heated air streams are structured to hold, and stabilize, the cans on the pins, most pin ovens continuously direct heated air against the can bottoms. Generally, however, the can bottoms do not have a coating applied thereto. As such, energy is lost or wasted when the heated air is directed against the can bottoms. This is a problem.

Pin ovens are operated at a temperature of about 420 F.° and are structured to, and do, operate substantially continuously. As such, the pin ovens are not structured to quickly cool down or quickly heat up. In this configuration, operators typically leave the pin oven heaters in operation even if the pin ovens are not in use. That is, for example, if the flow of cans being processed is interrupted due to a problem or routine maintenance on another machine in the can processing line, the pin oven heaters are operated so as to prevent the pin oven from cooling down. That is, rather than allowing the pin oven heaters to cease operation causing the pin oven to cool below operating temperatures, operators keep the pin oven heaters in operation. As such, energy is wasted due to the inability of the pin oven to heat up quickly. This is a problem.

Pin ovens further use fans to move the heated air and to vent the exhaust. With both natural gas heaters and exhaust fans in operation, pin ovens are loud, typically operating at about 95 dB. This is a problem as well. Further, energy consumption, both in terms of natural gas used to fuel the heaters and electricity to operate the exhaust fans, is substantial. Energy cost savings are, therefore, extremely important. This is a problem as well. Further, pin ovens as described above have reached the practical limits of can drying speeds and capacities. Presently, pin ovens process about 2400 cans per minute (cpm). Other can processing machines such as, but not limited to, the decorators, have exceeded this speed. Thus, the pin ovens are a bottleneck in the can processing line. This is a problem as well.

There is, therefore, a need for a can curing oven that is faster and more quiet than known curing ovens.

SUMMARY OF THE INVENTION

These needs, and others, are met by at least one embodiment of the disclosed and claimed concept which provides a can curing oven including a housing assembly, a transfer assembly, and a number of heating units. The housing assembly defines a generally enclosed space. The transfer assembly is structured to support and move a number of can bodies. The transfer assembly includes an elongated transfer belt. The transfer belt is movably coupled to the housing assembly and is structured to move through the housing assembly enclosed space. The number of heating units are structured to generate an effective amount of received heat.

A can curing oven in this configuration, and as further described below, solves the problems stated above.

BRIEF DESCRIPTION OF THE DRAWINGS

A full understanding of the invention can be gained from the following description of the preferred embodiments when read in conjunction with the accompanying drawings in which.

DESCRIPTION OF THE PREFERRED EMBODIMENTS

Figure 1:
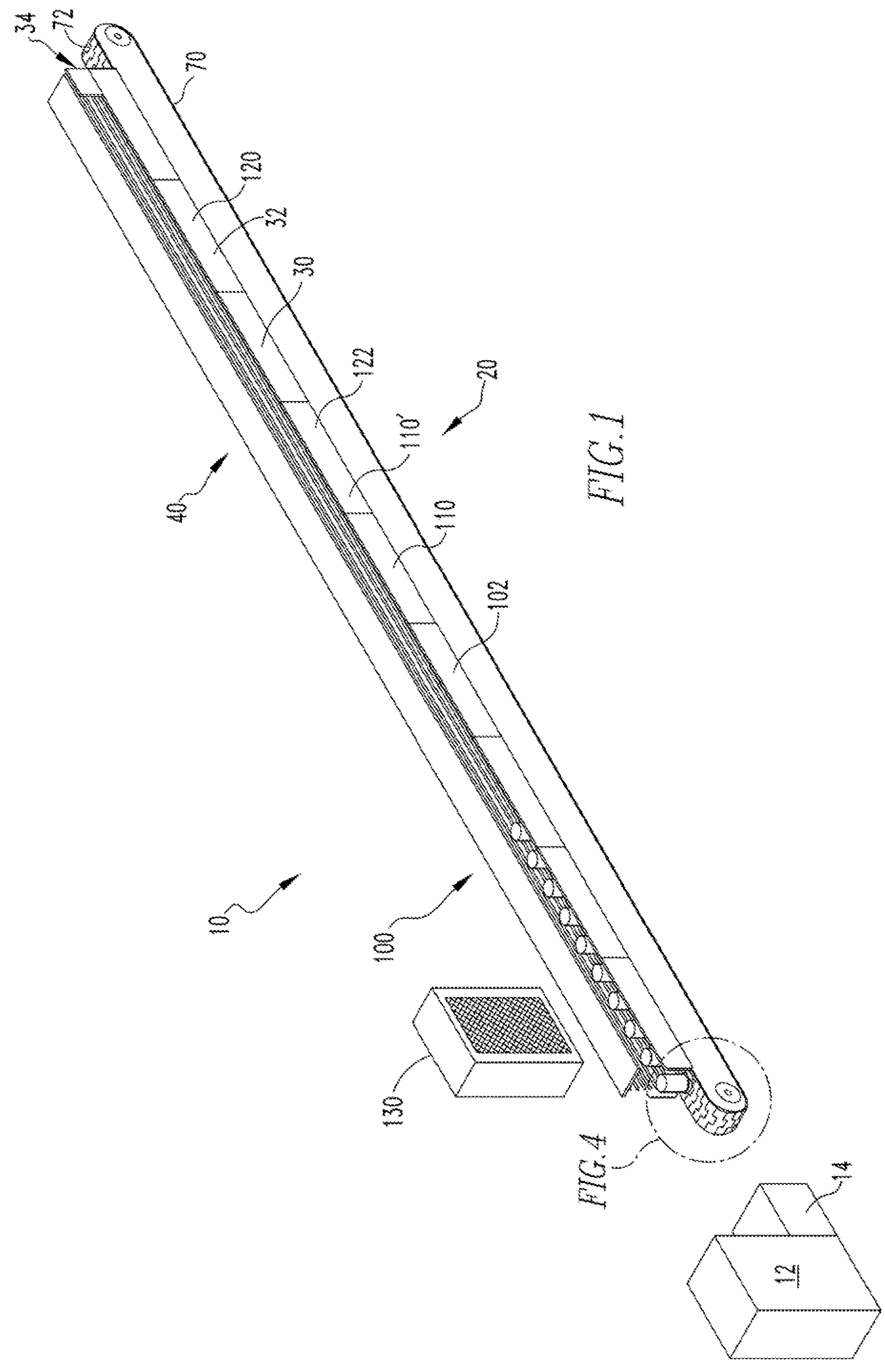
FIG. 1 is an isometric view of a decorator system.
Figure 2:
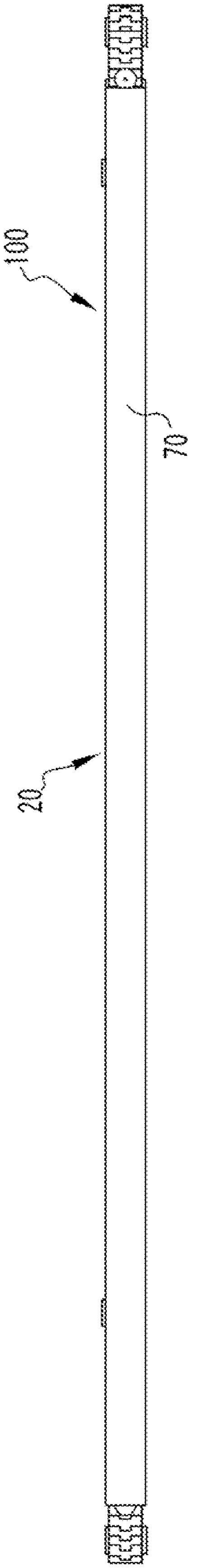
FIG. 2 is a top view of a decorator system.

It will be appreciated that the specific elements illustrated in the figures herein and described in the following specification are simply exemplary embodiments of the disclosed concept, which are provided as non-limiting examples solely for the purpose of illustration. Therefore, specific dimensions, orientations, assembly, number of components used, embodiment configurations and other physical characteristics related to the embodiments disclosed herein are not to be considered limiting on the scope of the disclosed concept.

Directional phrases used herein, such as, for example, clockwise, counterclockwise, left, right, top, bottom, upwards, downwards and derivatives thereof, relate to the orientation of the elements shown in the drawings and are not limiting upon the claims unless expressly recited therein.

As used herein, the singular form of “a,” “an,” and “the” include plural references unless the context clearly dictates otherwise.

As used herein, “structured to [verb]” means that the identified element or assembly has a structure that is shaped, sized, disposed, coupled and/or configured to perform the identified verb. For example, a member that is “structured to move” is movably coupled to another element and includes elements that cause the member-to move or the member is otherwise configured to move in response to other elements or assemblies. As such, as used herein, “structured to [verb]” recites structure and not function. Further, as used herein, “structured to [verb]” means that the identified element or assembly is intended to, and is designed to, perform the identified verb. Thus, an element that is merely capable of performing the identified verb but which is not intended to, and is not designed to, perform the identified verb is not “structured to [verb].”

As used herein, “associated” means that the elements are part of the same assembly and/or operate together, or, act upon/with each other in some manner. For example, an automobile has four tires and four hub caps. While all the elements are coupled as part of the automobile, it is understood that each hubcap is “associated” with a specific tire.

As used herein, a “coupling assembly” includes two or more couplings or coupling components. The components of a coupling or coupling assembly are generally not part of the same element or other component. As such, the components of a “coupling assembly” may not be described at the same time in the following description.

As used herein, a “coupling” or “coupling component(s)” is one or more component(s) of a coupling assembly. That is, a coupling assembly includes at least two components that are structured to be coupled together. It is understood that the components of a coupling assembly are compatible with each other. For example, in a coupling assembly, if one coupling component is a snap socket, the other coupling component is a snap plug, or, if one coupling component is a bolt, then the other coupling component is a nut or threaded bore. Further, a passage in an element is part of the “coupling” or “coupling component(s).” For example, in an assembly of two wooden boards coupled together by a nut and a bolt extending through passages in both boards, the nut, the bolt and the two passages are each a “coupling” or “coupling component.”

As used herein, a “fastener” is a separate component structured to couple two or more elements. Thus, for example, a bolt is a “fastener” but a tongue-and-groove coupling is not a “fastener.” That is, the tongue-and-groove elements are part of the elements being coupled and are not a separate component.

As used herein, the statement that two or more parts or components are “coupled” shall mean that the parts are joined or operate together either directly or indirectly, through one or more intermediate pans or components, so long as a link occurs. As used herein, “directly coupled” means that two elements are directly in contact with each other. As used herein, “fixedly coupled” or “fixed” means that two components are coupled so as to move as one while maintaining a constant orientation relative to each other. As used herein, “adjustably fixed” means that two components are coupled so as to move as one while maintaining a constant general orientation or position relative to each other while being able to move in a limited range or about a single axis. For example, a doorknob is “adjustably fixed” to a door in that the doorknob is rotatable, but generally the doorknob remains in a single position relative to the door. Further, a cartridge (nib and ink reservoir) in a retractable pen is “adjustably fixed” relative to the housing in that the cartridge moves between a retracted and extended position, but generally maintains its orientation relative to the housing. Accordingly, when two elements are coupled, all portions of those elements are coupled. A description, however, of a specific portion of a first element being coupled to a second element, e.g., an axle first end being coupled to a first wheel, means that the specific portion of the first element is disposed closer to the second element than the other portions thereof. Further, an object resting on another object held in place only by gravity is not “coupled” to the lower object unless the upper object is otherwise maintained substantially in place. That is, for example, a book on a table is not coupled thereto, but a book glued to a table is coupled thereto.

As used herein, the phrase “removably coupled” or “temporarily coupled” means that one component is coupled with another component in an essentially temporary manner. That is, the two components are coupled in such a way that the joining or separation of the components is easy and would not damage the components. For example, two components secured to each other with a limited number of readily accessible fasteners, i.e., fasteners that are not difficult to access, are “removably coupled” whereas two components that are welded together or joined by difficult to access fasteners are not “removably coupled.” A “difficult to access fastener” is one that requires the removal of one or more other components prior to accessing the fastener wherein the “other component” is not an access device such as, but not limited to, a door.

As used herein, “operatively coupled” means that a number of elements or assemblies, each of which is movable between a first position and a second position, or a first configuration and a second configuration, are coupled so that as the first element moves from one position/configuration to the other, the second element moves between positions/configurations as well. It is noted that a first element may be “operatively coupled” to another without the opposite being true.

As used herein, “functionally coupled” means that a number of elements or assemblies are coupled together so that a characteristic and/or function of one element/assembly is communicated or useable by the other element/assembly. For example, a characteristic of an extension cord is the ability to communicate electricity. When two extension cords are “functionally coupled,” the two extension cords are coupled so that electricity is communicable through both extension cords. As another example, two wireless routers, which have the characteristic of communication data, are “functionally coupled” when the two routers are in communication with each other (but not physically coupled to each other) so that data is communicable through both routers.

As used herein, the statement that two or more parts or components “engage” one another means that the elements exert a force or bias against one another either directly or through one or more intermediate elements or components. Further, as used herein with regard to moving parts, a moving part may “engage” another element during the motion from one position to another and/or may “engage” another element once in the described position. Thus, it is understood that the statements, “when element A moves to element A first position, element A engages element B," and "when element A is in element A first position, element A engages element B" are equivalent statements and mean that element A either engages element B while moving to element A first position and/or element A either enrages element B while in element A first position.

As used herein, "operatively engage" means "engage and move." That is, "operatively engage" when used in relation to a first component that is structured to move a movable or rotatable second component means that the first component applies a force sufficient to cause the second component to move. For example, a screwdriver may be placed into contact with a screw. When no force is applied to the screwdriver, the screwdriver is merely "temporarily coupled" to the screw. If an axial force is applied to the screwdriver, the screwdriver is pressed against the screw and "engages" the screw. However, when a rotational force is applied to the screwdriver, the screwdriver "operatively engages" the screw and causes the screw to rotate. Further, with electronic components, "operatively engage" means that one component controls another component by a control signal or current.

As used herein, "temporarily disposed" Means that a first element(S) or assembly(ies) is resting on a second element (s) or assembly(ies) in a manner that allows the first element/assembly to be moved without having to decouple or otherwise manipulate the first element. For example, a book simply resting on a table, i.e., the book is not glued or fastened to the table, is "temporarily disposed" On the table.

As used herein, "correspond" indicates that two structural components are sized and shaped to be similar to each other and may be coupled with a minimum amount of friction. Thus, an opening which "corresponds" to a member is sized slightly larger than the member so that the member may pass through the opening with a minimum amount of friction. This definition is modified if the two components are to fit "snugly" together. In that situation, the difference between the size of the components is even smaller whereby the amount of friction increases. If the element defining the opening and/or the component inserted into the opening are made from a deformable or compressible material, the opening may even be slightly smaller than the component being inserted into the opening. With regard to surfaces, shapes, and lines, two, or more, "corresponding" surfaces, shapes, or lines have generally the same size, shape, and contours.

As used herein, a "path of travel" or "path," when used in association with an element that moves, includes the space an element moves through when in motion. As such, any element that moves inherently has a "path of travel" or "path." Further, a "path of travel" or "path" relates to a motion of one identifiable construct as a whole relative to another object. For example, assuming a perfectly smooth road, a rotating wheel (an identifiable construct) on an automobile generally does not move relative to the body (another object) of the automobile. That is, the wheel, as a whole, does not change its position relative to, for example, the adjacent fender. Thus, a rotating wheel does not have a "path of travel" or "path" relative to the body of the automobile. Conversely, the air inlet valve on that wheel (an identifiable construct) does have a "path of travel" or "path" relative to the body of the automobile. That is, while the wheel rotates and is in motion, the air inlet valve, as a whole, moves relative to the body of the automobile.

As used herein, the word "unitary" means a component that is created as a single piece or unit. That is, a component that includes pieces that are created separately and then coupled together as a unit is not a "unitary" component or body.

As used herein, the term "number" shall mean one or an integer greater than one (i.e., a plurality). That is, for example, the phrase "a number of elements" means one element or a plurality of elements. It is specifically noted that the term "a 'number' of [X]" includes a single [X].

As used herein, in the phrase "[x] moves between its first position and second position," or, "[y] is structured to move [x] between its first position and second position," "[x]" is the name of an element or assembly. Further, when [x] is an element or assembly that moves between a number of positions, the pronoun "its" means "[x]," i.e., the named element or assembly that precedes the pronoun "its."

As used herein, a "radial side/surface" for a circular or cylindrical body is a side/surface that extends about, or encircles, the center thereof or a height line passing through the center thereof. As used herein, an "axial side/surface" for a circular or cylindrical body is a side that extends in a plane extending, generally perpendicular to a height line passing through the center of the cylinder. That is, generally, for a cylindrical soup can, the "radial side/surface" is the generally circular sidewall and the "axial side(s)/surface(s)" are the top and bottom of the soup can. Further, as used herein, "radially extending" means extending in a radial direction or along a radial line. That is, for example, a "radially extending" line extends from the center of the circle or cylinder toward the radial side/surface. Further, as used herein, "axially extending" means extending in the axial direction or along an axial line. That is, for example, an "axially extending" line extends front the bottom of a cylinder toward the top of the cylinder and substantially parallel to a central longitudinal axis of the cylinder.

As used herein, "generally curvilinear" includes elements having multiple curved portions, combinations of curved portions and planar portions, and a plurality of planar portions or segments disposed at angles relative to each other thereby forming a curve.

As used herein, a "planar body" or "planar member" is a generally thin element including opposed, wide, generally parallel surfaces, i.e., the planar surfaces of the planar, member, as well as a thinner edge surface extending between the wide parallel surfaces. That is, as used herein, it is inherent that a "planar" element has two opposed planar surfaces. The perimeter, and therefore the edge surface, may include generally straight portions, e.g., as on a rectangular planar member, or be curved, as on a disk, or have any other shape.

As used herein, for any adjacent ranges that share a limit, e.g., 0%-5% and 5%-10, or, 0.05 inch-0.10 inch and 0.001 inch-0.05 inch, the upper limit of the lower range, i.e., 5% and 0.05 inch in the examples above, means slightly less than the identified limit. That is, in the example above, the range 0%-5% means 0%-4.999999% and the range 0.001 inch-0.05 inch means 0.001 inch-0.04999999 inch.

As used herein, "upwardly depending" means an element that extends upwardly and generally perpendicular from another element.

As employed herein, the terms "can" and "container" are used substantially interchangeably to refer to any known or suitable container, which is structured to contain a substance (e.g., without limitation, liquid; food; any other suitable substance), and expressly includes, but is not limited to, beverage cans, such as beer and beverage cans, as well as food cans.

As used herein, a "can body" includes a base and a depending, or upwardly depending, sidewall. The "can body" is unitary. In this configuration, the "can body" defines a generally enclosed space. Thus, the "can body." i.e., the base and sidewall, also include(s) an outer surface and an inner surface. That is, for example, a "can body" includes a sidewall inner surface and a sidewall outer surface.

As used herein, "about" in a phrase such as "disposed about [an element, point or axis]" or "extend about [an element, point or axis]" or "[X] degrees about an [an element point or axis]," means encircle, extend around, or measured around. When used in reference to a measurement or in a similar manner, "about" means "approximately," i.e., in an approximate range relevant to the measurement as would be understood by one of ordinary skill in the art.

As used herein, an "elongated" element inherently includes a longitudinal axis and/or longitudinal line extending in the direction of the elongation.

As used herein, "generally" means "in a general manner" relevant to the term being modified as would be understood by one of ordinary skill in the art.

As used herein, "substantially" means "for the most part" relevant to the term being modified as would be understood by one of ordinary skill in the art.

As used herein, "at" means on and/or near relevant to the term being modified as would be understood by one of ordinary skill in the art.

A decorator system 10 is shown in FIGS. 1-6. The decorator system 10 is structured to, and does, apply a coating to a can body 1 and cure that coating. In an exemplary embodiment, the can body 1 is generally cylindrical and includes a base 2 and a sidewall 3. As noted above, the can body 1 has an inner surface and an outer surface; thus, there is a can body sidewall outer surface 4 and a can body sidewall inner surface 5. Further, a generally cylindrical can body 1 includes a longitudinal axis 6. The coating (not shown) is applied to the can body sidewall outer surface 4.

The decorator system 10 includes a decorator assembly 12 (shown schematically) and a can curing oven 20. As is known, the decorator assembly 12 is structured to, and does, apply a coating, or coatings, to the can body 1. Further, as is known, the decorator assembly 12 is structured to, and does, process over 2400 cans per minute (hereinafter, "cpm"). The speed of the decorator assembly in cpm is, as used herein, the "can decorator speed." Thus, as used herein, a "maximum can decorator speed" is over 2400 cpm. As is known, the coatings include, but are not limited to, inks, paints, varnishes, and lacquers. The decorator assembly 12 includes a transfer assembly 14 that is structured to, and does, move one can body 1 at a time to the can curing oven 20.

As discussed in detail below, the can curing oven 20, and more specifically the heating assembly 100, is structured to, and does, generate a total effective amount of received heat. As used herein, a "total effective amount of received heat" (or "total effective amount of received radiant heat") means heat received (or radiant heat received) at, or by, the can body 1 sufficient to cure the coating(s) thereon and not substantially more than the minimal amount required to cure the coating on the can body 1. Thus, after the can body 1 moves through the can curing oven 20, the coating thereon is cured and the can body 1 is ready for further processing. As used herein, "received heat" (or "received radiant heat") means the energy (or radiant energy) received at, or by, the can body 1. It is understood that "received heat" is dependent upon a number of variables including, but not limited to, the energy output of the heating assembly 100, discussed below, the distance between the heating units 102 and the can bodies 1, and the duration, i.e., the amount of time, the can bodies 1 are exposed to the heat and/or the heating units 102. It is understood that those of skill in the art understand how to adjust these variables to determine a desirable configuration of the can curing oven 20. As discussed below, in one exemplary embodiment the can curing, oven 20 is optimized for speed (as measured in cpm). Further, the can curing oven 20 is, in other embodiments, also optimized for size, energy efficiency, and/or economic efficiency. Each configuration requires the optimization of multiple variables. Further, a single heating unit 102, discussed below, is structured to, and does, generate a "proportional effective amount of received heat." As used herein, a "proportional effective amount of received heat" means a portion of the "total effective amount of received heat" generated by a single heating unit 102 of the beating assembly 100.

Further, as used herein, and when using a radiant heating unit 110, discussed below, the radiant heating unit 110 is disposed an "effective distance" from a transfer assembly 70, discussed below. As used herein, an "effective distance" means the optimal distance between the radiant heating unit 110 and the can body 1 to achieve a desired amount of heat transfer. As used herein, there are two desired amounts of heat transfer; a "narrow band" heat transfer and a "wide band" heat transfer. As used herein, a "narrow band" means a strip about inch wide. Thus, a radiant heating unit 110 configured to achieve a "narrow band" heat transfer is positioned at an "effective distance" so as to maximize heat transfer over a strip about inch wide. In an exemplary embodiment, the strip extends generally vertically (top to bottom) on the can body sidewall outer surface 4.

As used herein, a "wide band" means a width generally equal to the diameter of the can body 1. Thus, a radiant heating unit 110 configured to achieve a "wide band" heat transfer is positioned at an "effective distance" so as to maximize heat transfer over an area equal to about one half the can body sidewall 3 (when the can body sidewall 3 is generally cylindrical). That is, a "wide band effective distance" means the optimal distance between the radiant heating unit 110 and the can body 1 to achieve the maximum heat transfer to one side of the can body sidewall outer surface 4.

Further, it is understood that in one embodiment the can curing oven 20, and more specifically the transfer assembly 70 is structured to have an operating speed corresponding to the maximum can decorator speed. As used herein, an "operating speed" is the speed (in cpm) of the assembly in operation as opposed to a speed the assembly can achieve when not in operation. That is, for example, the transfer assembly 70 has a maximum operating speed wherein the transfer assembly 70 moves can bodies as the coating is cured. The transfer assembly 70 may, however, be able to move at a greater speed when not encumbered by can bodies 1. Such a non-"operating speed" is not relevant to this application. In an exemplary embodiment, the transfer assembly 70 moves can bodies 1 at a speed equal to the maximum can decorator speed.

The can curing oven 20 includes a housing assembly 30, a transfer assembly 70, and a heating assembly 100. The housing assembly 30 includes a number of sidewalls 32 that define a generally enclosed space 34. The housing assembly 30, in an exemplary embodiment, is generally straight and has a length of between about 1.0 m and 6.0 m, or about 4 m, a width of between about 80 mm and 300 mm, or about 150 mm, and a height of between about 200 mm and 500 mm, or about 300 mm. In this configuration, the housing assembly 30 has a volume of between about 16,000 $cm^3$ and 900,000 $cm^3$, or about 180,000 $cm^3$. As used herein, a housing assembly 30 with a volume of between about 16,000 $cm^3$ and 900,000 $cm^3$ is a "limited volume" and this solves a problem noted above. As used herein, a housing assembly 30 with a volume of about 180,000 $cm^3$ is a "specific limited volume" and this solves a problem noted above. As discussed below, the transfer assembly 70 is also structured to be configured in a serpentine path. Thus, it is understood that the housing assembly 30 is not limited to the elongated, generally straight configuration shown in FIGS. 1-6.

As shown, and in an exemplary embodiment, the housing assembly sidewalls 32 are also radiant heating unit plates 120. That is, as used herein, elements identified as radiant heating units 110 are also part of the housing assembly 30. It is understood that the housing assembly 30, in another exemplary embodiment, not shown, includes a sidewall made from materials such as, but not limited to, sheet metal.

Figure 4:
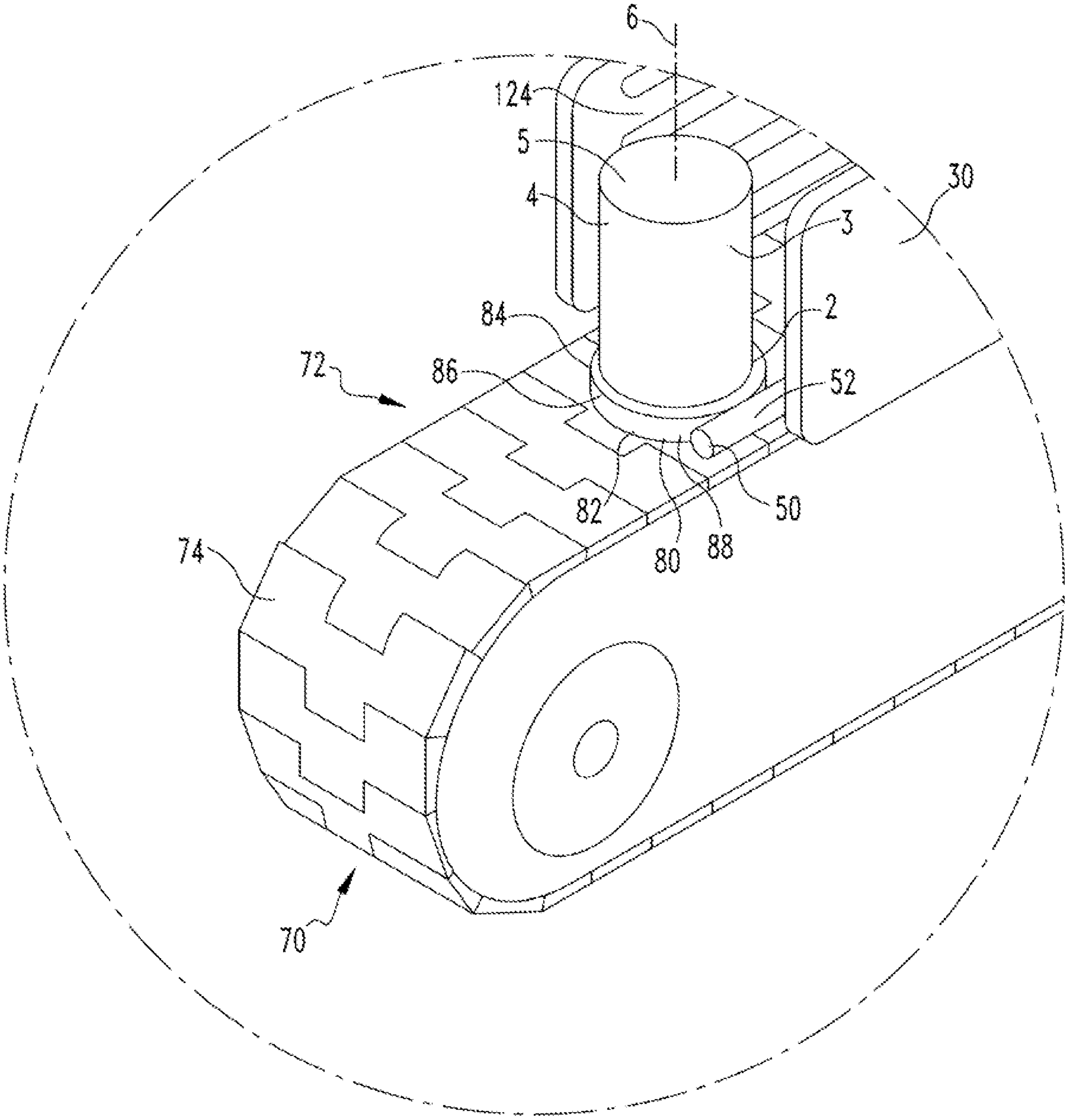
FIG. 4 is a detail isometric view of one end of a decorator system.
Figure 5:
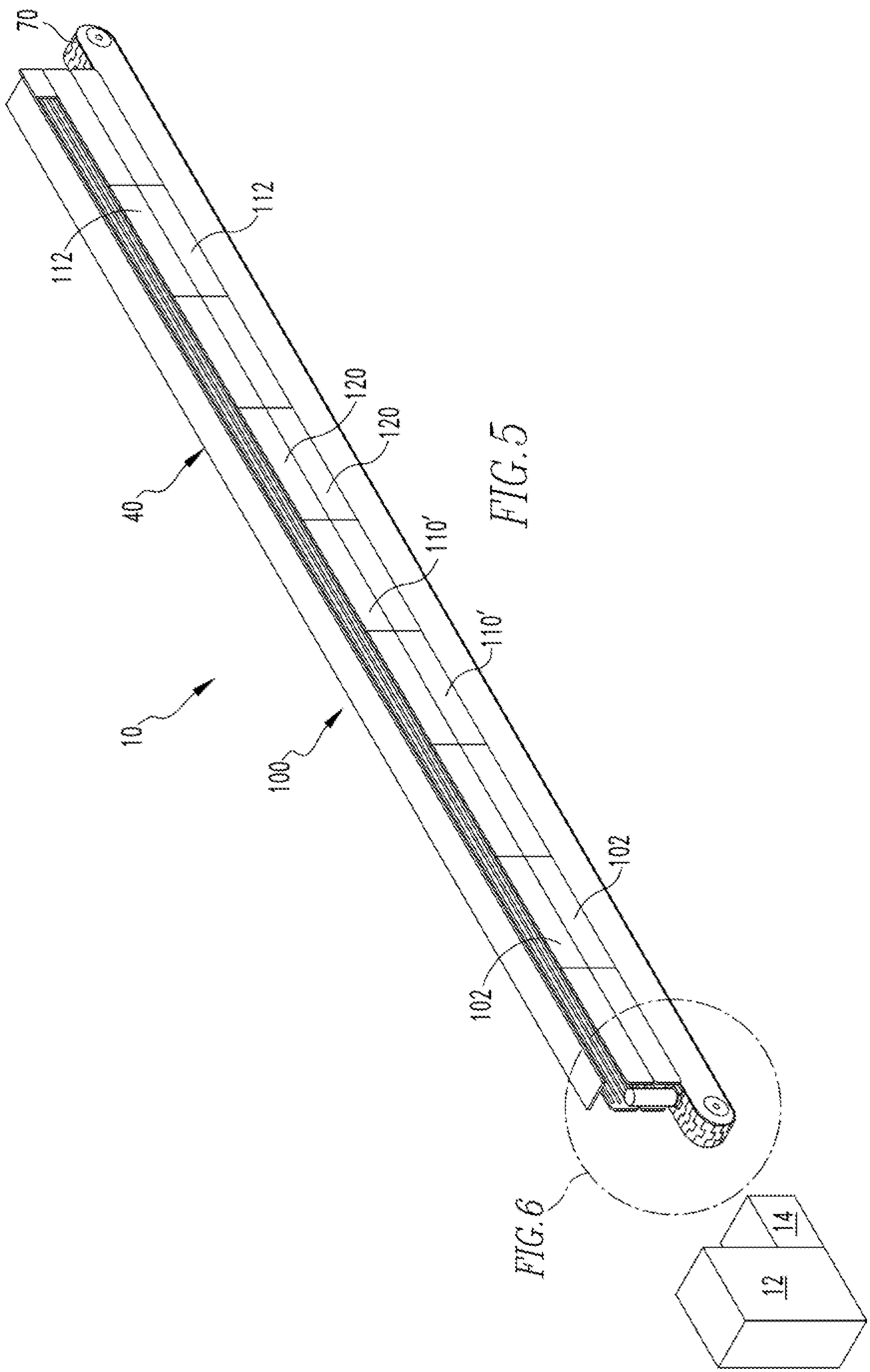
FIG. 5 is an isometric view of a decorator system with the can curing oven in another configuration.
Figure 6:
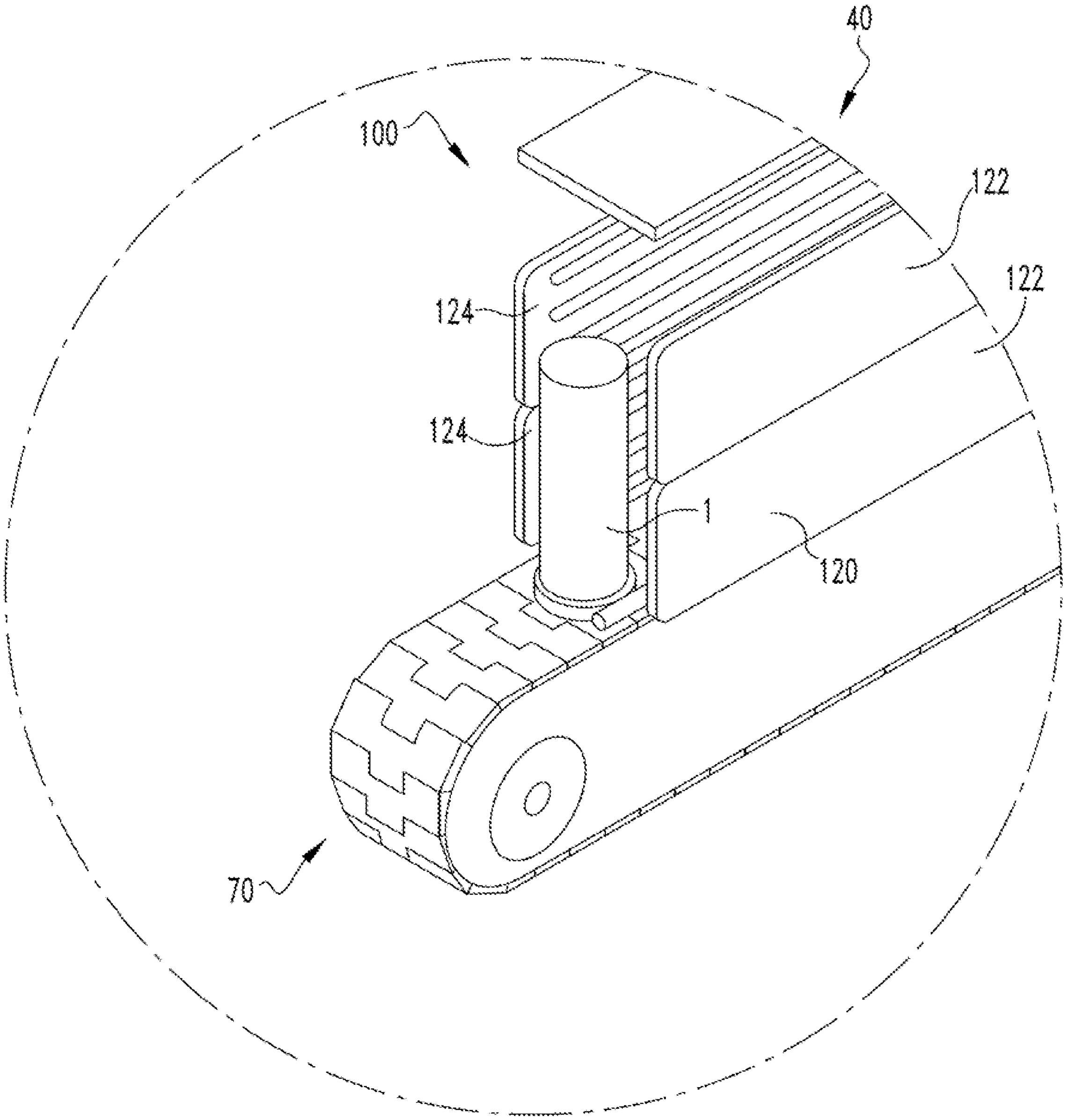
FIG. 6 is a top view of a decorator system with the can curing oven in another configuration.

The housing assembly 30 further includes an adjustable mounting assembly 40. The housing assembly adjustable mounting assembly 40 is structured to, and does, position each radiant heating unit plate 120, discussed below, an effective distance from the can bodies 1. As shown in FIGS. 4 and 6, the generally cylindrical can body 1 is shown in two configurations; a short, first configuration (FIG. 4) and a tall, second configuration (FIG. 6). In this embodiment, the adjustable mounting assembly 40 is structured to, and does, adjust the position and/or height of the radiant heating unit plates 120 so as to be at an effective distance from the can body sidewall outer surface 4.

In one embodiment, as shown, the adjustable mounting assembly 40 includes modular elements which, as shown, are modular radiant heating unit plates 120. As used herein, "modular" means a type of element or assembly wherein a plurality of elements or assemblies have substantially similar dimensions, contours, and other surface features including, but not limited to the position and type of couplings. In this configuration, "modular units" are temporarily coupled to each other and are structured to be, and are, easily replaceable. Further, in an exemplary embodiment, the "modular" units are also "linkable." As used herein, "linkable" means that modular units are structured to be, and are, functionally coupled together. In this embodiment, the modular radiant heating unit plates 120 are linkable and, as such, are also, as used herein, part of the adjustable mourning assembly 40. That is, for can bodies 1 in the first configuration, the modular and linkable radiant heating unit plates 120 are disposed in a single first row of opposed pairs, as discussed below. To process can bodies 1 in the second configuration, the modular, linkable radiant heating unit plates 120 have a stacked, second row of opposed pairs of modular and linkable radiant heating unit plates 120 disposed on top of the first row of opposed pairs of modular and linkable radiant beating unit plates 120.

In another embodiment, not shown, the adjustable mounting assembly 40 is structured to, and does, position the radiant heating unit plates 120 an effective distance from the can bodies 1 by positioning the radiant heating unit plates 120 in a corresponding orientation. That is, in another embodiment, not shown, the can bodies are tapered can bodies (not shown). Tapered can bodies are shaped generally like a foam cup. That is, the tapered can body has a smaller radius near the bottom and a larger radius at the top. Thus, relative to a vertical line, the sidewall is angled. The adjustable mounting assembly 40 is structured to, and does, position the radiant heating unit plates 120 at an angle generally corresponding to the angle of the tapered can body sidewall 3 so that the plane of the radiant heating unit plates 120 is generally parallel to the tapered can body sidewall. It is understood that a tapered can body 1 is one possible configuration for a can body and the adjustable mounting assembly 40 is structured to, and does, position the radiant heating unit plates 120 an effective distance from the can bodies 1 regardless of the shape of the can bodies 1.

The housing assembly 30 further includes an elongated drive bar 50. The housing assembly drive bar 50 is temporarily, operatively coupled to each transfer assembly support pad 80, discussed below, and is, as used herein, also part of the transfer assembly 70. The housing assembly drive bar 50 is, in an exemplary embodiment, an elongated body 52 that extends adjacent the transfer assembly transfer belt 72. As discussed below, the housing assembly drive bar 50 is stationary and engages the radial surface of each transfer assembly support pad 80. In one embodiment, each transfer assembly support pad 80 is rotatably coupled to the transfer assembly transfer belt 72. Thus, the engagement between the housing assembly drive bar 50 and the radial surface of each transfer assembly support pad 80 causes each transfer assembly support pad 80 to rotate.

The transfer assembly 70 is structured to, and does, move a number of can bodies 1. The transfer assembly 70 includes, in one exemplary embodiment, a chain with can body support pins, similar to a traditional pin oven, none shown. In an exemplary embodiment, however, the transfer assembly 70 does not include pins, i.e., elongated supports which can bodies are disposed over and which require an air stream to maintain the can body 1 on the pin. This solves a problem stated above. In an exemplary embodiment, the transfer assembly 70 includes an elongated transfer belt 72. As shown, the transfer assembly transfer belt 72 includes a number of segments 74 which are movably coupled to each other. As shown, the transfer assembly transfer belt 72 extends over a generally linear path. It is understood that the generally linear path is exemplary and that the transfer assembly transfer belt 72 in other embodiments follows a non-linear path including, but not limited to, a serpentine path, a vertical loop, a vertical serpentine path, or a helical path. In such alternate paths, the radiant heating unit plates 120 are, in an exemplary embodiment, structured, to provide energy/heat in multiple directions. For example, a radiant heating unit plate 120 is disposed between folds of a serpentine path and heat can bodies 1 on both folds of the serpentine path.

The transfer assembly transfer belt 72 is structured to be, and is, movably coupled to the housing assembly 30. The transfer assembly 70 further includes a drive assembly (not shown) that is structured to be, and is, operatively coupled to the transfer assembly transfer belt 72. That is, the transfer assembly drive assembly (not shown) is structured to, and does, impart motion to the transfer assembly transfer belt 72 so that the transfer assembly transfer belt 72 moves over a looped path. The transfer assembly transfer belt 72 looped path extends through the housing assembly enclosed space 34. The transfer assembly transfer belt 72 is structured to, and does, operate at a temperature of over 150° C. In an exemplary embodiment, the transfer assembly transfer belt 72 is made from steel or a composite material.

In an exemplary embodiment, the transfer assembly 70 includes a number of support pads 80. The transfer assembly support pads 80 are substantially similar and only one is described. Each transfer assembly support pad 80 is structured to, and does, resist elevated temperatures operated at a temperature of over 150° C. Each transfer assembly support pad 80 is structured to, and does, temporarily couple a can body 1 to the transfer assembly transfer belt 72. In one embodiment, the transfer assembly support pad 80 includes a generally disk-like body 82, i.e., a short cylinder. The transfer assembly support pad body 82 includes a coupling device 84 that is structured to temporarily couple a can body 1 to the transfer assembly support pad body 82.

In one embodiment, the transfer assembly support pad body coupling device 84 is a number of magnets or a magnetizable construct (none shown) such as, but not limited to, pan electro-magnet. A magnet or a magnetizable construct is disposed in each transfer assembly support pad body 82. Each magnet or a magnetizable construct is structured to, and does, temporarily couple a can body 1 to the transfer assembly support pad body 82.

In another exemplary embodiment, the transfer assembly support pad body coupling device 84 includes a vacuum assembly (not shown.) The transfer assembly support pad body coupling device vacuum assembly is structured to, and does, apply a vacuum to the can body 1 whereby the can body 1 is temporarily coupled to the transfer assembly support pad body 82. That is, the vacuum assembly includes a negative pressure device structured to generate a negative pressure, a number of conduits in fluid communication with the negative pressure device, and a nozzle at each transfer assembly support pad body 82. It is understood that, when a can body 1 is disposed on a transfer assembly, support pad body 82, the vacuum assembly is actuated and applies a negative pressure to each can body 1 disposed on a transfer assembly support pad body 82. The negative pressure temporarily couples each can body 1 to an associated transfer assembly support pad body 82.

In another exemplary embodiment, the transfer assembly support pad body coupling device 84 includes a temporary adhesive not shown). The temporary adhesive is structured to, and does, temporarily couple a can body 1 to the transfer assembly support pad body 82.

Each transfer assembly support pad body 82 is one of a driven pad, a free pad or a fixed pad. As used herein, a “driven pad” means a support pad body 82 that is structured to, and does, rotate relative to the associated transfer assembly transfer belt. Further, a “driven pad” means that the transfer assembly support pad body 82 is operatively engaged by another element, or assembly, and the operative engagement causes the transfer assembly support pad body 82 to rotate relative to the transfer assembly transfer belt 72. As used herein, a “free pad” means a support pad body 82 that is structured to, and does, rotate relative to the associated transfer assembly transfer belt. Further, a “free pad” is not operatively engaged by another element, or assembly but rather is free to rotate in response to forces applied (intentionally or unintentionally) to the can body 1 which cause the transfer assembly support pad body 82 to rotate relative to the transfer assembly transfer belt 72. Further, a “free pad” is free to rotate in response to unintentional forces applied to the transfer assembly support pad body 82 which cause the transfer assembly support pad body to rotate relative to the transfer assembly transfer belt 72. As used herein, a “fixed pad” is a support pad body 82 that is fixed to the transfer assembly transfer belt 72 and does not rotate relative thereto.

In one exemplary embodiment, i.e., a driven pad embodiment, each transfer assembly support pad body 82 is rotatably coupled to the transfer assembly transfer belt 72 and is structured to, and does, rotate relative thereto. In the embodiment shown, the radial surface 86 of the disk-like transfer assembly support pad body 82 is an engagement surface. That is, the transfer assembly support pad body radial surf ice 86 is a generally circular drive engagement surface 88. In this embodiment, the housing assembly drive bar 50 is temporarily, operatively coupled to each transfer assembly support pad 80 and, as shown, the transfer assembly support pad body radial surface 86, i.e., the drive engagement surface 88. That is, the housing assembly drive bar 50 is structured to, and does, remain in a fixed position relative to the housing assembly 30. The housing assembly drive bar 50 is disposed adjacent the transfer assembly transfer belt 72. The housing assembly drive bar 50 is structured to, and does, operatively engage the driven pad body drive engagement surface 86. As the transfer assembly transfer belt 72 moves relative to the housing assembly 30, the housing assembly drive bar 50 contacts and operatively engages each transfer assembly support pad body 82. Because each transfer assembly support pad body 82 is rotatably coupled to the transfer assembly transfer belt 72, friction causes each transfer assembly support pad body 82 to rotate relative to the transfer assembly transfer belt 72. The radius of each transfer assembly support pad body 82 is selected so that, given a selected speed of the transfer assembly transfer belt 72, the transfer assembly support pad bodies 82 rotate at a selected speed.

In one exemplary embodiment, i.e., a free pad embodiment, the transfer assembly support pad bodies 82 are rotatably coupled to the transfer assembly transfer belt 72. In this embodiment, force is applied to the can body 1 via moving air. That is, a fan assembly, or similar assembly, is structured to move air over the can bodies 1 causing the can bodies 1 and the transfer assembly support pad bodies 82 to rotate. Alternatively, the transfer assembly support pad bodies 82 are simply free to rotate and rotate randomly in response to vibration in the transfer assembly transfer belt 72.

The heating assembly 100 includes a number of heating units 102. The heating assembly 100, i.e., the heating units 102, are structured to, and do, generate a total effective amount of received heat. In an exemplary embodiment, the number of heating units 102 includes a number of infrared heating units 110. Each infrared heating unit 110 includes a number of infrared emitters 112. The infrared heating units 110 are structured to, and do, generate a total effective amount of received radiant heat. That is, the radiant heat generated by the infrared heating units 110 is sufficient to cure the coating on the can body 1. In an exemplary embodiment, the infrared heating units 110 are modular heating units.

There are many types of infrared heating units 110 that are suitable for use in the heating assembly 100 including, but not limited to, fueled infrared heating units 110' and bulb infrared heating units 110". As used herein, a “fueled infrared heating unit 110'” means an infrared heating unit 110 wherein a fuel such as, but not limited to, natural gas or oil is burned to generate energy that is emitted as infrared radiation. Thus, as used herein “fueled infrared heating units 110'” include “gas infrared heating units” which are “fueled infrared heating units 110"” fueled by natural gas, and, “oil infrared heating units” which are “fueled infrared heating units 110'” fueled by oil. As used herein, a “bulb infrared heating unit 110"” means a light bulb, or similar constructs including, but not limited to, light emitting diodes (LEDs), that are structured to emit infrared radiation. The following discussion will use fueled infrared heating units 110' and bulb infrared heating units 110" as examples, but the claims are not limited to these types of infrared heating units 110 unless the term “fueled” infrared heating units 110' or “bulb” infrared heating units 110" is recited in the claim. As is known, a bulb infrared heating unit 110" is actuated by applying electricity to the bulb. As such, a “bulb” infrared heating unit 110" is also, as used herein, an electrical infrared heating unit. Thus, in an exemplary embodiment, each infrared heating unit 110 is selected from the group consisting of, consisting essentially of, or including electrical infrared heating units, gas infrared heating units, or oil infrared heating units.

In an exemplary embodiment, the fueled infrared heating units 110' include a number of radiant heating unit plates 120. As is known, and as used herein, a “radiant heating unit plate” 120 includes a generally planar body 122 wherein at least one of the planar surfaces is structured to, and does, emit infrared radiation. Hereinafter, this surface is identified as an “IR emitter surface” 124. In another embodiment, both of the planar surfaces are structured to, and do, emit infrared radiation. In an embodiment wherein the radiant heating unit plates 120 are structured to emit infrared radiation from one of the planar surfaces, the radiant heating unit plates 120 are disposed on either side of the transfer assembly transfer belt 72. That is, each radiant beating unit plate 120 is oriented with the IR emitter surface 124 adjacent (or facing) the transfer assembly transfer belt 72, as shown in FIG. 4. As discussed above, the radiant heating unit plates 120 are structured to, and do, provide either a “narrow band” heat transfer or a “wide band” heat transfer.

Further, it is understood that the adjustable mounting assembly 40 is structured to, and does, position the radiant heating unit plates 120 at an effective distance from the can bodies 1. For example, if the can bodies have two configurations, large diameter and small diameter, and if the effective distance is 0.25 inch for either can body 1 configuration, the adjustable mounting assembly 40 is structured to move each radiant heating unit plate 120 laterally relative to the transfer assembly transfer belt 72 so that the IR emitter surface 124 is positioned 0.25 inch from the can body sidewall outer surface 4. That is, when a batch of small diameter can bodies 1 are processed, the adjustable mounting assembly 40 is adjusted so as to move the IR emitter surface 124 on each radiant heating unit plate 120 to be 0.25 inch from the can body sidewall outer surface 4. When a batch of large diameter can bodies 1 are processed, the adjustable mounting assembly 40 is adjusted outwardly so as to move the IR emitter surface 124 on each radiant heating unit plate 120 to be 0.25 inch from the can body sidewall outer surface 4.

Further, in an exemplary embodiment, the radiant heating unit plates 120 are modular radiant heating unit plates 120. That is, the radiant heating unit plates 120 include couplings for fuel, exhaust, and power as well as mechanical couplings. The use of modular radiant heating unit plates 120 allows the heating assembly 100 to be configured to cure can bodies 1 having different configurations. So as to maintain using a generally cylindrical can body 1 as an example, FIGS. 4 and 6 show a generally cylindrical can body 1 in a short, first configuration (FIG. 4), and, a tall, second configuration (FIG. 6). When a batch of first configuration can bodies 1 are processed, the modular radiant heating unit plates 120 are disposed in two opposing rows on either side of the transfer assembly transfer belt 72, as described above. When a batch of second configuration can bodies 1 are processed, an additional row of modular radiant heating unit plates 120 are disposed on top of the existing opposing rows. It is again noted that the modular radiant heating unit plates 120 are also part of the adjustable mounting assembly 40. Thus, the adjustable mounting assembly 40 is structured to position each infrared heating unit 110, i.e.; each modular radiant heating unit plate 120, in a first position, wherein each infrared heating unit 110 is structured to generate a proportional effective amount of received heat, or received radiant heat, for a can body 1 of a first configuration, or, a second position, wherein each infrared heating unit 110 is structured to generate a proportional effective amount of received heat, or received radiant heat, for a can body 1 of a second configuration.

It is noted that in FIGS. 1-6, the modular radiant heating unit plates 120 define the housing assembly 30 and the enclosed space 34. As shown, the housing assembly 30 and the enclosed space 34 are generally elongated and generally straight. In this configuration, the transfer assembly transfer belt 72 is also generally elongated and straight. This configuration of a transfer assembly transfer belt 72 has, as used herein, a “simplified” operating path. That is, a transfer assembly transfer belt 72 in a “simplified” operating path does not require complex mechanical assemblies to accommodate changes in the direction of the conveyor. It is understood that a “simplified” operating path includes a simple one loop operating path. A transfer assembly transfer belt 72 in a “simplified” operating path overcomes the problems stated above.

It is understood that this configuration is exemplary and that the housing assembly 30 and the enclosed space 34, in other embodiments, have different shapes. For example, in an embodiment wherein a number of modular radiant heating unit plates 120 have two IR emitter surfaces 124, the modular radiant beating unit plates 120 are disposed in a serpentine pattern so that those modular radiant heating unit plates 120 having two IR emitter surfaces 124 are positioned so as to heat can bodies passing by on both sides of the modular radiant heating unit plates 120. In this embodiment, the transfer assembly transfer belt 72 is structured to follow the serpentine path between the modular radiant heating unit plates 120.

Figure 3:
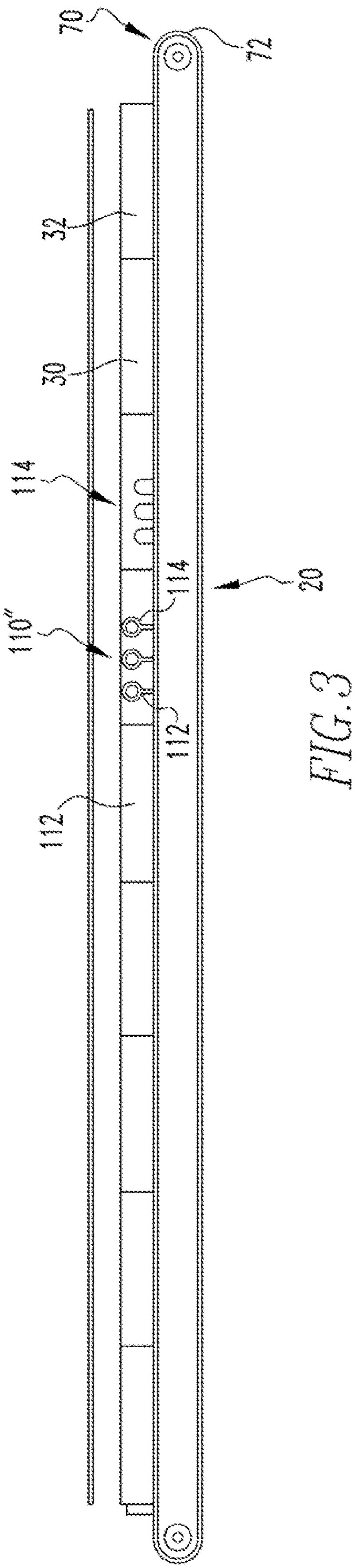
FIG. 3 is a side view of a decorator system.

In another embodiment, shown in FIG. 3, the infrared heating units 110 are “bulb” infrared heating units 110" that are structured to be, and are, selectively actuated. As used herein, “selectively actuated” means that an actuatable assembly or device is actuated at a selected time or upon selected conditions being present. With an infrared light bulb, or similar construct (LED), actuation means that the bulb is illuminated and emitting infrared light. In an exemplary embodiment, the bulb infrared heating units 110' are actuated when a can body sidewall outer surface 4 is an effective distance away. For example, in an embodiment wherein the infrared heating units 110 include a plurality of columns of infrared emitters 112, i.e., individual infrared LEDs 114, each infrared emitter 112 is structured to be selectively actuated when the can body sidewall outer surface 4 is an effective distance away. When a can body sidewall outer surface 4 is not an effective distance away, the infrared LEDs 114 are unactuated, i.e., dark. Thus, the bulb infrared heating units 110" are structured to, and do, save energy because the bulb infrared heating units 110" are not actuated when a can body sidewall outer surface 4 is not an effective distance away. This solves the problem(s) noted above.

Further, the infrared heating units 110, whether fueled infrared heating units 110' or bulb infrared heating units 110", are structured to, and do, apply heat substantially to said can body sidewall outer surface 4. That is, unlike known convection pin ovens wherein heated air is blown onto the uncoated can bottoms so as to assist holding the can bodies 1 on the pins, the infrared heating units 1-10 apply heat substantially to the can body sidewall outer surface 4. To "apply heat substantially to the can body sidewall outer surface 4" as used herein means that, for the most part, the heat generated by the heating units 102 is applied to the can body sidewall outer surface 4 and not to the can body base 2. This solves the problem(s) noted above.

In one embodiment, infrared heating units 110 are structured to become fully active almost instantaneously or, stated alternately, in less than one second. As used herein, "fully active" means to become hot enough to cure the coating applied to the can body. That is, unlike a heated air convection oven, which must heat the air in the housing assembly enclosed space 34, the infrared heating units 110 generate sufficient infrared energy to cure the coatings in much less time. This solves the problems noted above. Further, an infrared heating unit 110 generates less noise than a heated air convection oven. In an exemplary embodiment, a can curing oven 20 without a fan generates between about 10 dB and 20 dB, or about 15 dB. As used herein, a noise level of between about 10 dB and 20 dB is a "reduced amount of noise." As used herein, a noise level of about 15 dB is a "specific reduced amount of noise." A can curing oven 20 generates a reduced amount of noise, or a specific reduced amount of noise, solving the problems) stated above. Further, when a can curing oven 20 as described above utilizes a fan, the curing oven 20 generates between about 70 dB and 80 dB, or about 75 dB, which is still less noise than the prior art curing ovens and also solves the problem(s) stated above.

In one embodiment, the can curing oven 20 is optimized for speed. That is, as noted above, it is desirable for the curing oven to have an intake speed that is equivalent to the output speed of the decorator assembly 12. In an exemplary embodiment, the output speed of the decorator assembly 12, and therefore the intake speed of the can curing oven 20, is about 2400 cpm. Further, as noted above, other variables that effect the curing of a coating on a can body include, but are not limited to the energy output of the heating assembly 100, the distance between the heating units 102 and the can bodies 1, and the duration the can bodies 1 are exposed to the heat and/or the heating units 102. Further, the size of the housing assembly 30, and/or the housing assembly enclosed space 34, is also dependent upon these variables, or, alternately, these variables are dependent upon the size of the housing assembly 30, and/or the housing assembly enclosed space 34. It is further noted, that of these variables, only output of the heating assembly 100 is limited. That is, the can bodies 1 are adversely affected when the temperature is over about 220° C. (428° F.). Thus, in one exemplary embodiment, the heating assembly 100 also includes a blower assembly 130 structured to remove heated air from the housing assembly 30, and/or the housing assembly enclosed space 34. The blower assembly 130 is structured to, and does, lower the amount of heat in the housing assembly 30, and/or the housing assembly enclosed space 34.

Thus, given a decorator assembly 12 operating at over 2400 cpm, in one exemplary embodiment the can curing oven 20 is optimized for speed and includes a housing assembly 30, and/or the housing assembly enclosed space 34, with a volume of between about 16,000 $cm^3$ and 900,000 $cm^3$, or about 180,000 $cm^3$. As noted above, this is a "limited volume" or a "specific limited volume." In this embodiment, the heating assembly 100 includes about 20 radiant heating units 110 wherein each radiant heating unit 110 is structured to and does, provide a proportional effective amount of received heat. In this embodiment, the heating assembly 100 includes a blower assembly 130 structured to remove heated air from the housing assembly 30. Further, in this exemplary embodiment, the transfer assembly transfer belt 72 has a simplified operating path. A can curing oven 20 in this configuration solves the problem(s) noted above.

In another embodiment, the can curing oven 20 is optimized for economic efficiency. As used herein, a can curing oven 20 "optimized for economic efficiency" means that the can curing oven 20 utilizes beating units 102 with the lowest "total cost." As used herein, the "total cost" of a heating unit 102 is a combination of the cost of the heating unit 102 as built/purchased as well as the cost of operating the heating unit over a period of at least one year. That is, both of these factors are optimized.

While specific embodiments of the invention have been described in detail, it will be appreciated by those skilled in the art that various modifications and alternatives to those details could be developed in light of the overall teachings of the disclosure. Accordingly, the particular arrangements disclosed are meant to be illustrative only and not limiting as to the scope of invention which is to be given the full breadth of the claims appended and any and all equivalents thereof.

What is claimed is:

1. A can curing oven comprising:

a housing assembly including a heating assembly comprising a number of laterally disposed heating units; and a transfer assembly including a transfer belt structured to support a number of can bodies in a vertical orientation and to move said number of can bodies past said number of laterally disposed heating units to cure a coating on said can bodies, wherein said number of laterally disposed heating units comprises a plurality of modular and linkable heating unit plates, wherein said modular and linkable heating unit plates are disposed in a single first row of opposed pairs.

2. The can curing oven of claim 1 wherein said number of laterally disposed heating units is structured to generate a total effective amount of received heat.

3. The can curing oven of claim 1 wherein said number of heating units includes a number of infrared heating units.

4. The can curing oven of claim 3 wherein said number of infrared heating units includes a plurality of infrared heating units.

5. The can curing oven of claim 3 wherein each infrared heating unit is selected from the group consisting of electrical infrared heating units, gas infrared heating units, or oil infrared heating units.

6. The can curing oven of claim 1 wherein said housing assembly includes an adjustable mounting assembly; and wherein said adjustable mounting assembly is structured to position each heating unit so as to be at an effective distance from a sidewall surface of a can body.

7. The can curing oven of claim 1 wherein said housing assembly is elongated and generally straight.

8. The can curing oven of claim 7 wherein said elongated generally straight housing assembly has a length, a width, and a height; wherein the length is between about 1.0 m and 6.0 m; wherein the width is between about 80 mm and 300 mm; and wherein the height is between about 200 mm and 500 mm.

9. The can curing oven of claim 7 wherein said transfer belt includes a plurality of segments; and wherein said transfer belt is structured to move over a looped path which extends through said elongated generally straight housing assembly.

10. The can curing oven of claim 3 wherein said transfer assembly includes a plurality of support pads; and wherein each said support pad structured to support a base portion of can body.

11. The can curing oven of claim 10 wherein each said support pad is one of a driven pad, a free pad or a fixed pad.

12. The can curing oven of claim 10 wherein each support pad includes a can coupling; and wherein each can coupling is selected from the group consisting of a magnetic coupling or a vacuum coupling.

13. The can curing oven of claim 1 wherein said number of heating units are structured to process can bodies at a maximum can decorator speed.

14. The can curing oven of claim 1 wherein said number of heating units are structured to become fully active in less than one second.

15. A can curing oven comprising:

a housing assembly including a heating assembly comprising a number of laterally disposed heating units; and a transfer assembly including a transfer belt structured to support a number of can bodies in a vertical orientation and to move said number of can bodies past said number of laterally disposed heating units to cure a coating on said can bodies, wherein said number of laterally disposed heating units comprises a plurality of modular and linkable heating unit plates, wherein said modular and linkable heating unit plates are disposed in a plurality of stacked rows of opposed pairs of modular and linkable heating unit plates.

16. The can curing oven of claim 15 wherein said housing assembly is elongated and generally straight.

17. The can curing oven of claim 16 wherein said transfer belt includes a plurality of segments; and wherein said transfer belt is structured to move over a looped path which extends through said elongated generally straight housing assembly.

18. The can curing oven of claim 15 wherein said transfer assembly includes a plurality of support pads; and wherein each said support pad structured to support a base portion of can body.

19. The can curing oven of claim 18, wherein each said support pad is one of a driven pad, a free pad or a fixed pad.

20. A can curing oven comprising:

a housing assembly including a heating assembly comprising a number of laterally disposed heating units; and a transfer assembly including a transfer belt structured to support a number of can bodies in a vertical orientation and to move said number of can bodies past said number of laterally disposed heating units to cure a coating on said can bodies, wherein said transfer assembly includes a plurality of support pads; and wherein each said support pad structured to support a base portion of can body, wherein said plurality of support pads are driven support pads, wherein each driven pad is rotatably coupled to said transfer assembly transfer belt; and wherein said driven pad includes a body having a generally circular drive engagement surface, wherein said housing assembly includes an elongated drive bar; and wherein said drive bar is disposed adjacent said transfer belt and structured to operatively engage said driven pad body drive engagement surface.

* * * * *